(12) United States Patent
Shaffer et al.

(10) Patent No.: US 6,304,548 B1
(45) Date of Patent: *Oct. 16, 2001

(54) APPARATUS AND METHOD FOR PREVENTING NETWORK REROUTING

(75) Inventors: Shmuel Shaffer, Palo Alto; William J. Beyda, Cupertino, both of CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/579,881

(22) Filed: May 25, 2000

Related U.S. Application Data

(63) Continuation of application No. 08/896,321, filed on Jul. 17, 1997, now Pat. No. 6,091,706.

(51) Int. Cl.[7] ............................. G01R 31/08; G06F 11/00
(52) U.S. Cl. .............................................. 370/229; 370/252
(58) Field of Search .................................... 370/229, 230, 370/231, 232, 235, 236, 237, 238, 252, 431; 709/235, 239

(56) References Cited

U.S. PATENT DOCUMENTS

| | | | |
|---|---|---|---|
| 4,494,138 | 1/1985 | Shimp | 348/12 |
| 4,862,496 | 8/1989 | Kelly et al. | 379/221 |
| 4,907,224 | 3/1990 | Scoles et al. | 370/443 |
| 4,929,940 | 5/1990 | Franaszek et al. | 340/825.02 |
| 5,003,534 | 3/1991 | Gerhardt et al. | 370/322 |
| 5,012,469 | 4/1991 | Sardana | 370/322 |
| 5,036,535 | 7/1991 | Gechter et al. | 379/210 |
| 5,121,387 | 6/1992 | Gerhardt et al. | 370/322 |
| 5,229,993 | 7/1993 | Fourdriat et al. | 370/445 |
| 5,241,534 | 8/1993 | Omuro et al. | 370/218 |
| 5,271,058 | 12/1993 | Andrews et al. | 379/210 |
| 5,283,897 * | 2/1994 | Georgiadis et al. | 709/105 |
| 5,297,144 | 3/1994 | Gilbert et al. | 370/346 |
| 5,331,631 | 7/1994 | Teraslinna | 370/392 |
| 5,388,097 | 2/1995 | Baugher et al. | 370/455 |
| 5,432,845 | 7/1995 | Burd et al. | 379/210 |
| 5,467,345 * | 11/1995 | Cutler, Jr. et al. | 370/60 |
| 5,502,722 | 3/1996 | Fulghum | 370/343 |
| 5,528,583 | 6/1996 | Acampora et al. | 370/256 |
| 5,528,622 | 6/1996 | Cadd et al. | 370/202 |
| 5,586,120 | 12/1996 | Cadd | 370/468 |
| 5,590,118 | 12/1996 | Nederlof | 370/218 |

(List continued on next page.)

FOREIGN PATENT DOCUMENTS 0494 513 A2   12/1991   (EP) .

OTHER PUBLICATIONS

Jean Regnier and W. Hugh Cameron, "State Department Dynamic Traffic Management for Telephone Networks", pp. 42–53, 2460 IEEE Communications Magazine Oct. 28, 1990, No. 10, New York, US.

Copy of European Search Report for Application No. 98113267.3–2209–, date of search report mailed: Sep. 28, 2000.

*Primary Examiner*—Alpus H. Hsu
*Assistant Examiner*—Brian Nguyen

(57) ABSTRACT

A method and apparatus for preventing network rerouting when the overhead associated with the reroute operation could result in system resources being overwhelmed. The system monitors link congestion and CPU utilization that will be caused by rerouting. A comparator determines whether the amount of congestion and CPU utilization is beyond an acceptable predetermined threshold. A reroute control unit prevents rerouting if the amount of link congestion and CPU utilization exceeds the predetermined threshold.

14 Claims, 3 Drawing Sheets

U.S. PATENT DOCUMENTS

| | | | |
|---|---|---|---|
| 5,590,126 | 12/1996 | Mishra et al. | 370/329 |
| 5,602,839 | 2/1997 | Annapareddy et al. | 370/403 |
| 5,642,360 * | 6/1997 | Trainin | 370/230 |
| 5,673,253 * | 9/1997 | Shaffer | 370/229 |
| 5,675,577 * | 10/1997 | Komatsu | 370/237 |
| 5,729,527 * | 3/1998 | Gerstel et al. | 370/228 |
| 5,787,072 * | 7/1998 | Shimojo et al. | 370/231 |
| 5,802,146 * | 9/1998 | Dulman | 379/34 |
| 5,844,886 * | 12/1998 | Szentesi | 370/230 |
| 5,848,055 * | 12/1998 | Fedyk et al. | 370/228 |
| 5,854,899 * | 12/1998 | Cllon et al. | 709/238 |
| 6,091,706 * | 7/2000 | Shaffer et al. | 370/229 |

* cited by examiner

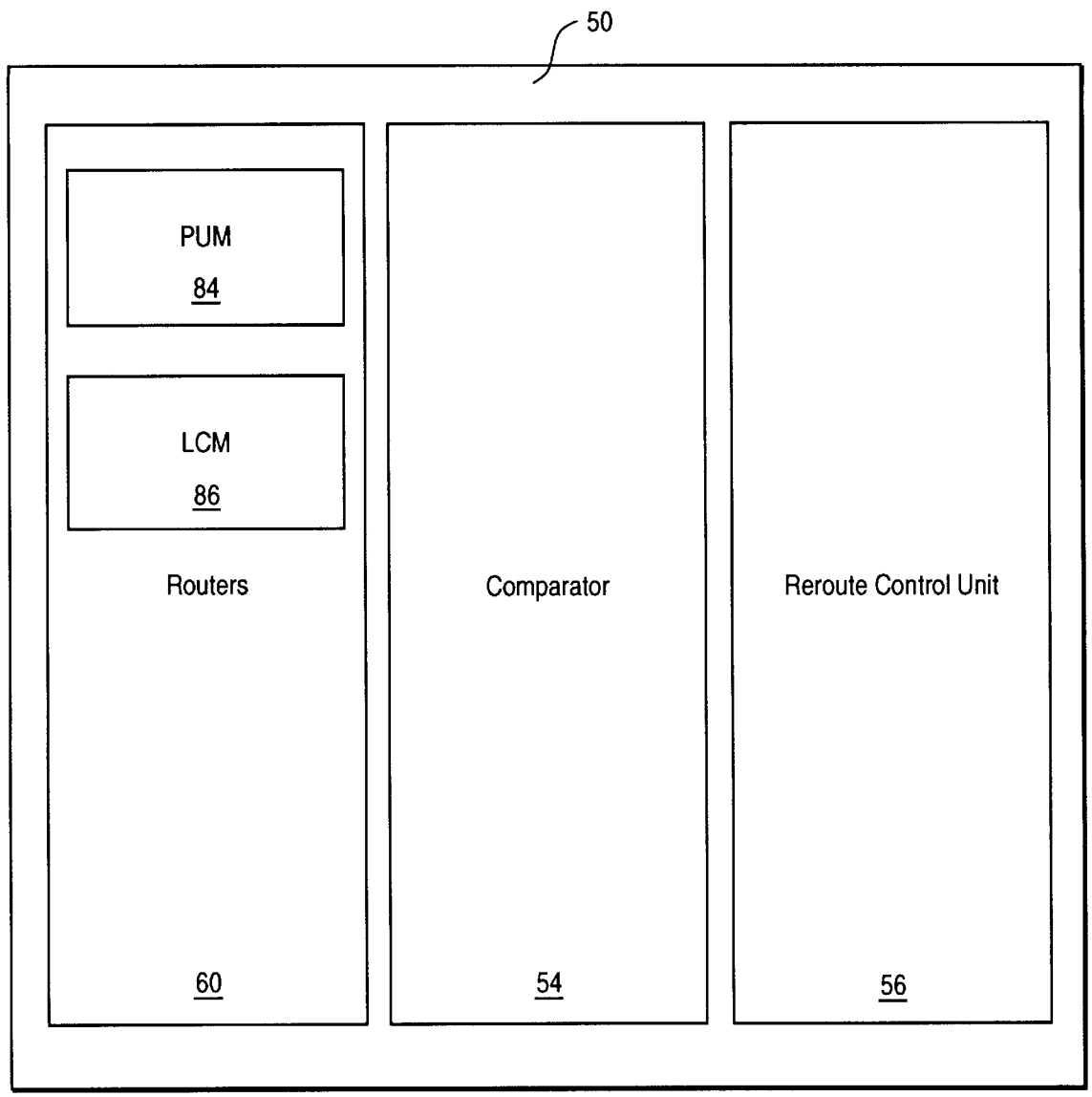
FIG_1

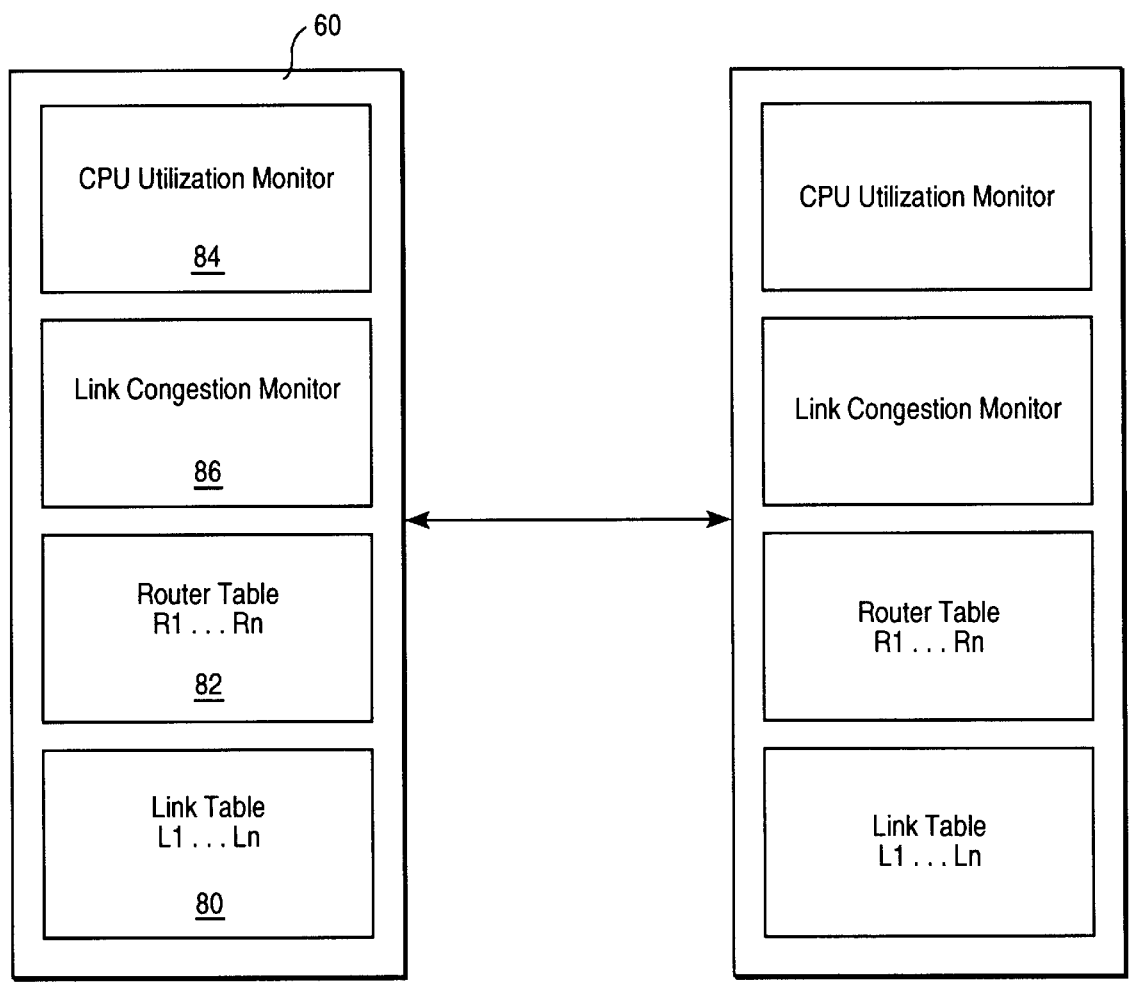
FIG_2

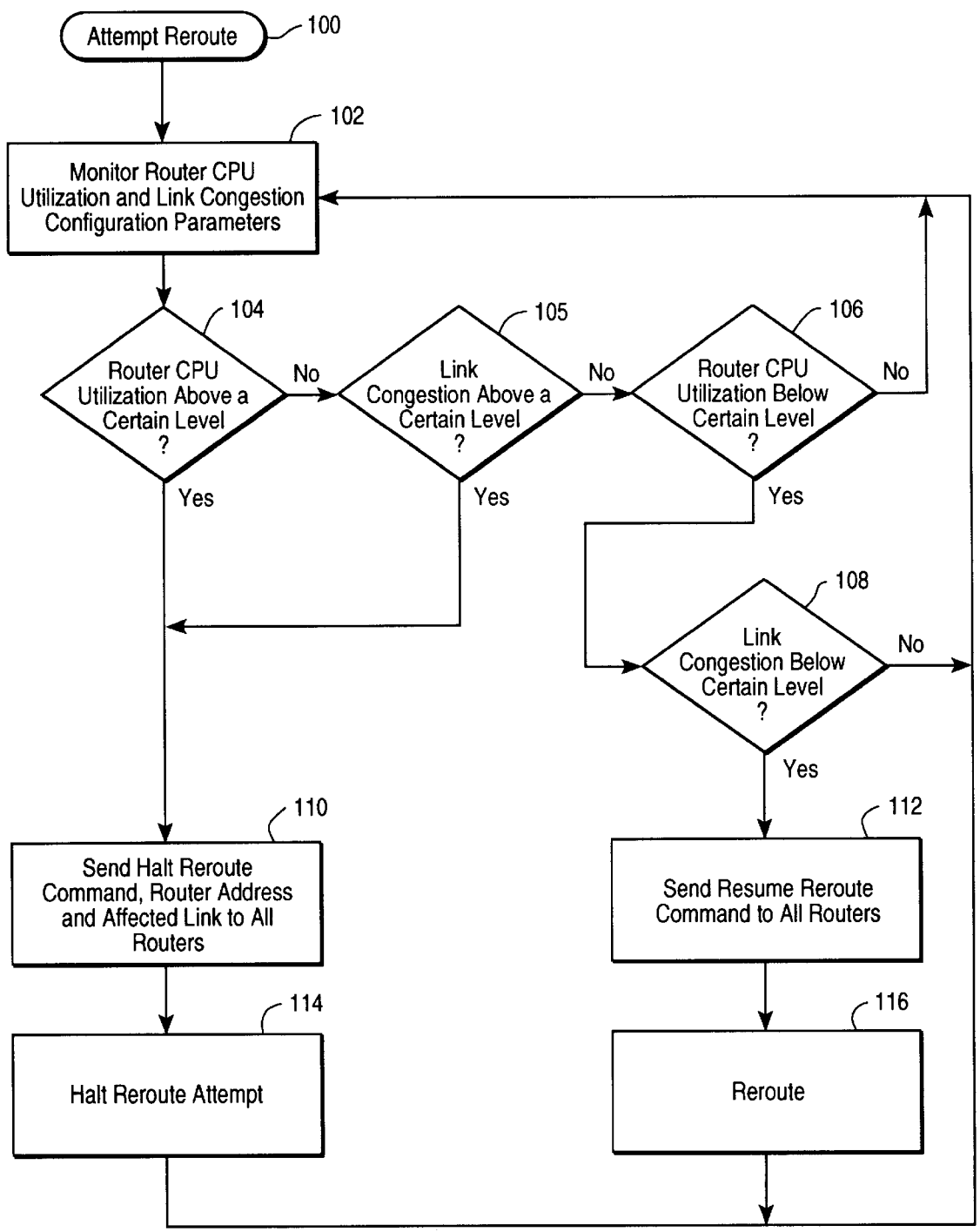
FIG_3

APPARATUS AND METHOD FOR PREVENTING NETWORK REROUTING

CROSS REFERENCE TO RELATED APPLICATIONS

This invention is related to APPARATUS AND METHOD FOR NETWORK RESOURCE PRESERVATION, Ser. No. 08/897,161, filed on Jul. 17, 1997.

This application is a continuation of U.S. patent application Ser. No. 08/896,321, filed Jul. 17, 1997, now U.S. Pat. No. 6,091,706.

BACKGROUND OF THE INVENTION

1. Field of the Invention

This invention generally relates to a network rerouting system and, more particularly, to a network rerouting system for preventing reroute overhead traffic from congesting links and overwhelming system resources.

2. Description of the Prior Art

It is well known that modern packet, frame, or cell based telecommunications reservations protocols require the reservation of bandwidth in a network for a particular connection. Generally, this bandwidth is reserved at the time the call is set up. Based on the requested bandwidth, a particular route is chosen over which the data will travel.

In certain instances, the most advantageous links may be congested at call set-up time or the requested bandwidth may not be available. This causes a reservation to be made for a connection on a route having links that are less than optimal. In other instances, the network may be in fallback mode wherein the originally reserved route for some reason, such as a link failure, becomes unavailable and the connection must be rerouted onto an alternate less optimal route. In either case, it is desirable to optimize the connection by rerouting it to a more optimal route when such a route becomes available.

Rerouting algorithms for choosing more optimal alternate data routes are known. These algorithms operate by first determining whether a more optimal route is available. If a more optimal route is available, the connection is rerouted to the new route by sending a message from a network supervisor to all the routers on both the original route and the new route.

Unfortunately, frequent rerouting can consume a significant portion of total available system resources. In particular, in a network, rerouting status and update messages are generated each time a rerouting request is made to the network. Because of the required constant monitoring of the network and the dynamic rerouting capabilities, the rerouting status and update messages in a complex network can generate significant traffic congestion on inter-router links as well as overwhelming a router's processing power. As a result, the burden of the overhead may make rerouting a less desirable option. In addition, known rerouting systems have no method of preventing reroutes based upon CPU utilization and link traffic congestion.

Therefore, there is a need for a rerouting system wherein network route optimization is allowed only when there is benefit to the connection and optimization is suspended when it is harmful to the connection.

SUMMARY OF THE INVENTION

Briefly, the present invention relates to a method and apparatus for preventing network rerouting during conditions when the reroute would result in system resources being overwhelmed through excessive router CPU utilization and increased traffic congestion, thereby negating the benefit of the new route. The system monitors the amount of link congestion and CPU utilization that will be caused by rerouting. A comparator is used to determine whether the amount of congestion and CPU utilization is above predetermined thresholds. A reroute control unit prevents rerouting if the amount of congestion and CPU utilization exceed the predetermined thresholds.

In one embodiment of the invention, rerouting commands, also referred to as protocol elements, are transmitted to the routers in a connection to either halt rerouting or enable rerouting. If rerouting is to be halted, a halt rerouting command along,with the address of the router and the affected link are sent to all routers. Similarly, if rerouting is allowed, a resume rerouting command is sent to all routers.

BRIEF DESCRIPTION OF THE DRAWINGS

Other features, objects and advantages of the present invention will become readily apparent and understood upon consideration of the following detailed description and attached drawings, wherein:

FIG. 1 is an overall block diagram of the rerouting system in accordance with the present invention.

FIG. 2 is a block diagram of routers in accordance with the present invention.

FIG. 3 is a flow diagram for determining if rerouting is to be allowed.

DETAILED DESCRIPTION OF THE INVENTION

The present invention relates to a system for preventing rerouting of a connection if the rerouting operation will result in significantly increased router CPU utilization and link traffic congestion. Rerouting prevention is achieved in a communications network by preventing rerouting of a connection if it is determined that the increased amount of CPU utilization and link traffic congestion, generated by the rerouting operation, would create increased traffic on the new route to make it less optimal than the original route. Because each router contains a list of all other routers in the network and also contains a list of all links on the network, the CPU utilization and link traffic congestion values may easily be observed for the entire connection. An important aspect of the invention relates to comparing the CPU utilization and link traffic congestion values with predetermined threshold values to determine whether a connection should be rerouted. If the CPU utilization and link traffic congestion values exceed the predetermined threshold, then rerouting is prevented. As such, the system of the present invention provides a platform for preventing network rerouting when the system determines that rerouting overhead will cause an alternate route to be less optimal than the originally routed connection.

A rerouting system enables rerouting of data over an alternate route in a communications network to take advantage of a more optimal route that may be available than the initially reserved route or the route being used during a particular connection. Furthermore, rerouting may also entail special packet resequencing techniques to prevent packet sequence from being altered at any time. Maintaining packet sequence is particularly critical when real time or isochronous data, such as a voice or video, is being transmitted over the route. Such rerouting and packet sequencing operations, because of their complexity, generate large numbers of messages for routers which result in significant amounts of traffic on the links. As mentioned above, rerouting must be prevented in those cases where the rerouting overhead overwhelms system resources.

An exemplary embodiment of a rerouting prevention system in accordance with the present invention, generally identified with the reference 50, is illustrated in FIG. 1. Although only a single router 60 is shown, it should be understood by those of ordinary skill in the art that the principles of the present invention are applicable to networks of various complexity having many different types and numbers of routers. The rerouting prevention system 50 includes one or more routers 60, a comparator 54, and a rerouting control unit ("RCU") 56.

Referring to FIG. 2, each router 60 has a CPU (not shown) that controls router operations and performs computations for finding new optimized routes, including determining the particular links and subsequent routers that a network connection will utilize in establishing an alternate route for the connection. Each router 60 keeps track of all the other routers and links in the network. In particular, each router 60 stores a table 82 in memory of every other router in the network and also keeps track of the status of every other router on the network as to whether the routers are accepting dynamic reroute messages. Acceptance of reroute messages is based on the amount of CPU utilization in each router.

Each of the routers 60 also keeps a table of all links 80 in the network. Each router 60 also keeps track of whether the links are accepting dynamic reroute messages. In this case, acceptance of reroute messages is based on the traffic congestion of each link. Based on whether the routers and links are accepting reroute messages, the first router on the path will only reroute the connection if the router and link tables indicate that all the routers and links affected by the rerouting can handle the reroute message traffic.

As mentioned above, CPU utilization and link congestion are the primary factors used in determining whether a particular connection should be rerouted. Each router monitors its own links and its own CPU. If the router's CPU utilization exceeds a predetermined threshold, the router will transmit a message to the other routers indicating that it can no longer accept additional rerouting. The other routers store this information in their respective tables and use it for determining their own routing. Similarly, each router monitors its own links. When link utilization reaches a threshold, the router will transmit a halt rerouting command indicating that rerouting cannot occur on the particular link. When CPU utilization or when link utilization returns to below-threshold levels, the router will again transmit a resume rerouting command to the other routers notifying them of this.

In particular, a link congestion monitor ("LCM") 86 is provided in each router for determining the level of traffic congestion in the links of a particular route. The LCM 86 constantly monitors the traffic through all its links in a network. When link congestion for a particular link reaches a threshold, the LCM 86 stores this information and transmits the halt rerouting command to the other routers, advising them that the traffic threshold for the particular link has been exceeded. When the traffic returns below the threshold on the link, the router sends update information in the form of the resume rerouting command to the other routers. Similarly, the router stores the halt rerouting information from the other routers.

Similarly, a processor utilization monitor ("PUM") 84 is included for keeping track of the amount of CPU power being expended by a router's CPU. In particular, the PUM 84 constantly monitors the activity level of its router CPU. This data may be stored in a memory unit or region (not shown) for later access. As mentioned above, much of router CPU activity is spent in calculating the proper links to use in forming a network connection if a reroute is requested. When CPU utilization reaches a threshold the router will refuse additional rerouting messages from other routers. The router then does not receive additional routing requests until the utilization returns below the threshold. The information is stored and other routers are notified of this fact. A similar message is sent when utilization returns below the threshold.

It is noted that the present invention can accommodate the situation in which more than one router has exceeded its utilization. For example, if one router is overloaded, it sends a halt reroute command to the other routers, as discussed above. In one embodiment, the router accesses its status memory and determines which other routers are refusing messages. The router will then hold its halt reroute command until it receives a message from the router indicating that it is now receiving messages. Alternatively, the threshold may be set such that the minimal overhead required to process a halt or resume reroute command message will be allowed, but other messages will be refused.

Referring once again to FIG. 1, the comparator 54 determines whether the LCM 86 and PUM 84 values are above a predetermined threshold. In particular, threshold percentages are preestablished for the amount of link congestion and router CPU utilization that the routers and links can tolerate before the overhead generated by the rerouting procedure overwhelms the router CPU and links. The comparator compares the actual values provided by the LCM 86 and PUM 84 against the predetermined threshold values. If any one of the actual values exceeds the predetermined threshold value, rerouting will be prevented to prevent a less optimal route from being selected. Conversely, if the LCM 86 and PUM 84 values are below the predetermined threshold level, rerouting will be allowed.

Furthermore, rerouting will also be disabled if either one of the LCM 86 or PUM 84 values is beyond a certain threshold level. Thus, if the router CPU utilization level is above a predetermined threshold, then the system will prevent the reroute. Or, if the link traffic congestion values is above a predetermined threshold, then the system will likewise prevent the reroute. As described above, however, both the LCM 86 and PUM 84 values must be below a predetermined threshold if rerouting is to be enabled.

The prevention and allowance of a reroute are controlled by the RCU 56. The RCU 56 sends a rerouting command to all the routers on the connection to either prevent the reroute operation or to let the command proceed. In particular, the RCU 56 is responsive to the results reported by the comparator 54. As mentioned above, if the comparator 54 determines that the LCM 86 and PUM 84 values are above a certain threshold, then rerouting will be halted. The RCU 56 will prevent the reroute operation from proceeding by transmitting a halt rerouting command 'H', which includes the address of the router and the affected link if applicable, to all the routers on the route. Similarly, if the comparator 54 determines that the LCM 86 and PUM 84 values are below a certain threshold, then rerouting will be allowed to continue. The RCU will allow the reroute operation to proceeding by transmitting a resume rerouting command 'R' to all the routers on the route.

It is noted that, in one embodiment, there is some hysteresis between the above thresholds to prevent unnecessary command generation. For example, without hysteresis, even the smallest changes in the LCM 86 and PUM 84 values could cause rapid transmittal of R and H commands to the router, thereby causing increased traffic on the links. Accordingly, the hysteresis provides an operating range within which inconsequential changes in the LCM 86 and PUM 84 values will not cause unnecessary overhead traffic.

Referring to FIG. 3, a flow diagram is shown depicting a reroute prevention routine used for determining whether a reroute is to be prevented from occurring. In step 100, the network attempts a reroute. Before the reroute is executed, however, the system retrieves the PUM and LCM data in step 102 to determine the amount of congestion on the new route and the CPU utilization of the router's CPU. If it is determined in steps 105 and 104 that the traffic congestion on the links including the route or the CPU utilization of the routers is higher than a predetermined level, then a message is sent to the system to halt rerouting in step 110. In step 114, the routers upon receiving the halt message will retain the previous route. The system will then return to step 102 and will continue to monitor LCM and PUM data values.

If in step 104 it is determined that the LCM and PUM data retrieved in step 102 do not exceed predetermined threshold, the system in step 106 first determines whether the router CPU utilization is below a certain threshold. If the PUM value is not below the threshold value, the system returns to step 102. If the PUM value is below the threshold value, the system in step 108 determines whether the traffic congestion on the links is below a predetermined threshold.

If the LCM value is not below the predetermined threshold, the system returns to step 102. If the congestion level is below the predeter ined threshold, then in step 112 a reroute message is sent to the routers to authorize the reroute. In step 116, the routers upon receiving the reroute message will reroute the connection to the new route. Upon completion of the reroute, the system returns to step 102.

Obviously, many modifications and variations of the present invention are possible in light of the above teachings. Thus, it is to be understood that, within the scope of the appended claims, the invention may be practiced otherwise than as specifically described above.

What is claimed is:

1. A communications network rerouting method, comprising:
    establishing a communications route using one or more routers, said route including one or more links for carrying data and each of said routers including a central processing unit (CPU);
    monitoring data traffic using a link congestion monitor on said links and storing values representative of link congestion;
    monitoring router CPU utilization and storing values representative of router CPU utilization;
    determining whether said link congestion monitor values and said CPU utilization monitor values exceed predetermined threshold; and
    enabling and disabling rerouting of said communications route responsive to said determining.

2. The communications network rerouting method as recited in claim 1, further comprising maintaining a table of all other routers on said communications route.

3. The communications network rerouting method as recited in claim 1, further comprising maintaining a table of all links comprising said communications route.

4. The communications network rerouting method as recited in claim 3, wherein said table further includes a list of routes accepting reroute messages.

5. The communications network rerouting method as recited in claim 3, wherein said table further includes a list of links accepting reroute messages.

6. The communications network rerouting method as recited in claim 1, further comprising transmitting a resume reroute message for enabling said rerouting.

7. The communications network rerouting method as recited in claim 1, wherein said enabling and disabling comprises transmitting a halt reroute message for disabling said rerouting.

8. A communications network rerouting method, comprising:
    establishing a communications route using one or more routers, said route comprised of one or more links for carrying data and each of said routers including a CPU, said one or more routers configured to implement dynamic rerouting responsive to one or more predetermined conditions;
    determining whether utilization of said CPU and congestion on said links exceed a first predetermined threshold;
    enabling and disabling rerouting of said communications route responsive to said determining,
    wherein said rerouting is disabled if either said CPU utilization or said link congestion exceed said first predetermined threshold.

9. A communications network rerouting method, comprising:
    establishing a communications route using one or more routers, said route comprised of one or more links for carrying data and each of said routers including a CPU, said one or more routers configured to implement dynamic rerouting responsive to one or more predetermined conditions;
    determining whether utilization of said CPU and congestion on said links exceed a first predetermined threshold;
    enabling and disabling rerouting of said communications route responsive to said determining,
    monitoring router CPU utilization;
    wherein said rerouting is enabled if both said CPU utilization and said data traffic are below a second predetermined threshold.

10. A communications network rerouting method, comprising:
    establishing a communications route using one or more routers, said route comprised of one or more links for carrying data and each of said routers including a CPU, said one or more routers configured to implement dynamic rerouting responsive to one or more predetermined conditions;
    determining whether utilization of said CPU and congestion on said links exceed a first predetermined threshold;
    enabling and disabling rerouting of said communications route responsive to said determining,
    monitoring data traffic on said links;
    wherein said first and said second predetermined thresholds include a predetermined level of hysteresis between said first and said second predetermined thresholds.

11. A method, comprising:
    providing one or more routers for establishing a communications route, said route including one or more links for carrying data and each of said routers including a central processing unit (CPU);

providing a link congestion monitor for monitoring data traffic on said links and storing values representative of link congestion;

providing a CPU resource utilization monitor for monitoring router CPU utilization and storing values representative of router CPU utilization;

providing a comparator for determining whether said link congestion monitor values and said CPU utilization monitor values exceed predetermined thresholds; and providing a rerouting control unit responsive to said comparator for enabling and disabling rerouting of said communications route.

12. A method, comprising:

providing one or more routers for establishing a communications route, said route comprised of one or more links for carrying data and each of said routers including a CPU, said one or more routers configured to implement dynamic rerouting responsive to one or more predetermined conditions;

providing a comparator for determining whether utilization of said CPU and congestion on said links exceed a first predetermined threshold.

providing a rerouting control unit responsive o said comparator for enabling and disabling rerouting of said communications route, wherein said rerouting control unit will disable rerouting if either said CPU utilization or said link congestion exceed said first predetermined threshold.

13. A method, comprising:

providing one or more routers for establishing a communications route, said route comprised of one or more links for carrying data and each of said routers including a CPU, said one or more routers configured to implement dynamic rerouting responsive to one or more predetermined conditions;

providing a comparator for determining whether utilization of said CPU and congestion on said links exceed a first predetermined threshold;

providing a rerouting control unit responsive to said comparator for enabling and disabling rerouting of said communications route, providing a CPU resource utilization monitor for monitoring router CPU utilization;

wherein said rerouting control unit will enable rerouting if both said CPU utilization and said data traffic are below a second predetermined threshold.

14. A method, comprising:

providing one or more routers for establishing a communications route, said route comprised of one or more links for carrying data and each of said routers including a CPU, said one or more routers configured to implement dynamic rerouting responsive to one or more predetermined conditions;

providing a comparator for determining whether utilization of said CPU and congestion on said links exceed a first predetermined threshold;

providing a rerouting control unit responsive to said comparator for enabling and disabling rerouting of said communications route, providing a link congestion monitor for monitoring data traffic on said links;

wherein said first and said second predetermined thresholds include a predetermined level of hysteresis between said first and said second predetermined thresholds.

* * * * *